US008417454B2

(12) United States Patent
Pfeifle et al.

(10) Patent No.: US 8,417,454 B2
(45) Date of Patent: Apr. 9, 2013

(54) METHOD AND APPARATUS FOR STORING OR DISPLAYING PRESPECIFIED GEOMETRIC OBJECTS AND COMPUTER PROGRAM PRODUCT

(75) Inventors: Martin Pfeifle, Seewald (DE); Volker Sasse, Lappersdorf (DE); Uwe Tantz, Nittendorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 12/516,271

(22) PCT Filed: Nov. 21, 2007

(86) PCT No.: PCT/EP2007/062607
§ 371 (c)(1),
(2), (4) Date: Aug. 24, 2009

(87) PCT Pub. No.: WO2008/062003
PCT Pub. Date: May 29, 2008

(65) Prior Publication Data
US 2010/0070177 A1    Mar. 18, 2010

(30) Foreign Application Priority Data

Nov. 24, 2006    (DE) .................... 10 2006 055 958

(51) Int. Cl.
*G01C 21/32* (2006.01)
*G01C 21/26* (2006.01)
*G09G 5/00* (2006.01)

(52) U.S. Cl. ........ 701/540; 701/400; 382/203; 382/305; 345/619

(58) Field of Classification Search .................. 701/211, 701/212, 208, 400, 540; 345/619; 382/203, 382/305
See application file for complete search history.

(56) References Cited

U.S. PATENT DOCUMENTS

| 6,092,076 | A | 7/2000 | McDonough |
| 6,247,019 | B1* | 6/2001 | Davies ......................... 340/989 |
| 6,532,304 | B1* | 3/2003 | Liu et al. ...................... 382/203 |
| 6,622,085 | B1* | 9/2003 | Amita et al. .............. 340/995.14 |
| 6,674,445 | B1* | 1/2004 | Chithambaram et al. .... 345/619 |
| 7,089,162 | B2* | 8/2006 | Nagel ............................... 703/2 |
| 7,324,895 | B2* | 1/2008 | Nagel ........................... 701/532 |

(Continued)

FOREIGN PATENT DOCUMENTS

| DE | 10055156 A1 | 5/2002 |
| DE | 102005049830 A1 | 7/2006 |
| WO | WO 2006018570 A2 | 2/2006 |

*Primary Examiner* — Thomas Black
*Assistant Examiner* — Wae Louie
(74) *Attorney, Agent, or Firm* — Cozen O'Connor

(57) ABSTRACT

To store geometric objects, a distance is determined from each prespecified objects to one other prespecified object. The distance represents a similarity of the corresponding prespecified objects. The prespecified objects are grouped together such that the prespecified objects are more similar with respect to prespecified geometric objects of the same group than with respect to objects of the other groups. For each group, a representative is ascertained, depending on the prespecified objects within the groups. The representatives of all the groups (are stored. In a representative fashion for the prespecified objects, only one identification of the prespecified object an indication of the corresponding representative of the prespecified object and values, by which a size and position of the corresponding representative is prespecified, is stored for each of the prespecified objects, depending on the size and the position of the corresponding prespecified objects.

19 Claims, 4 Drawing Sheets

U.S. PATENT DOCUMENTS

| | | | |
|---|---|---|---|
| 7,421,154 B2 * | 9/2008 | Kinjo | 382/305 |
| 7,477,269 B2 | 1/2009 | Sumizawa et al. | |
| 7,720,276 B1 * | 5/2010 | Korobkin | 382/154 |
| 2003/0218617 A1 * | 11/2003 | Ohto | 345/619 |
| 2005/0193003 A1 * | 9/2005 | Popovici | 707/104.1 |
| 2006/0195858 A1 | 8/2006 | Hirata | |
| 2008/0319718 A1 * | 12/2008 | Joussemet et al. | 703/2 |
| 2010/0070177 A1 * | 3/2010 | Pfeifle et al. | 701/212 |

* cited by examiner

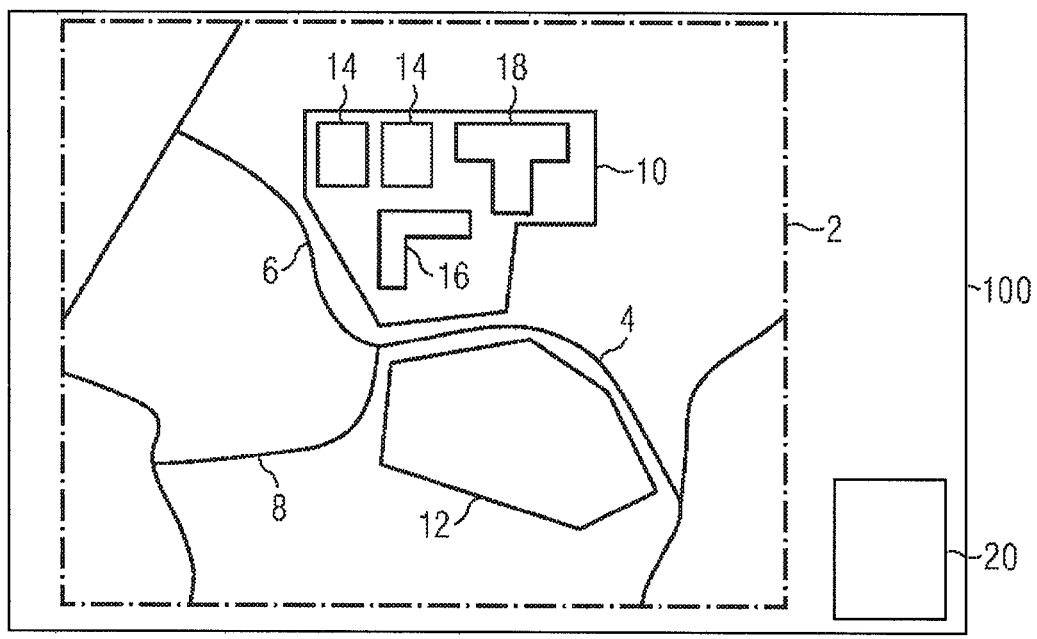
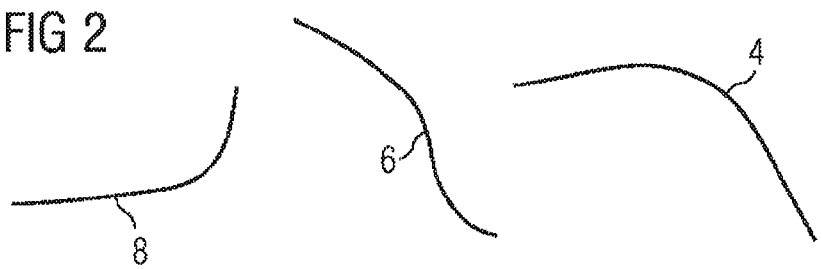
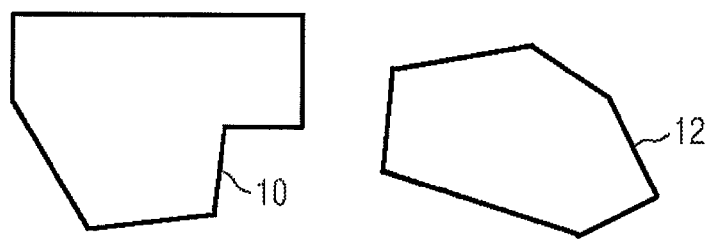
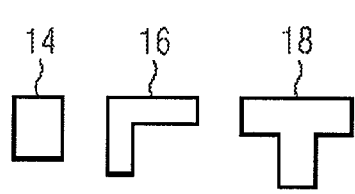

$$\begin{pmatrix} X' \\ Y' \end{pmatrix} = S \times \overbrace{\begin{pmatrix} \cos \text{ALPHA} & \sin \text{ALPHA} \\ -\sin \text{ALPHA} & \cos \text{ALPHA} \end{pmatrix}}^{\text{TRANS}} \begin{pmatrix} X - X_0 \\ Y - Y_0 \end{pmatrix} =$$

$$S \times \begin{pmatrix} \cos \text{ALPHA}(X - X_0) + \sin \text{ALPHA}(Y - Y_0) \\ -\sin \text{ALPHA}(X - X_0) + \cos \text{ALPHA}(Y - Y_0) \end{pmatrix}$$

| ID | S | ALPHA | $X_0; Y_0$ | REF |
|---|---|---|---|---|
| 1 | 2 | 5 | 10; 150 | 15 |
| 2 | 3.7 | 82 | 111; 887 | 15 |
| 3 | 0.8 | 17 | 2; 234 | 18 |
| ⋮ | ⋮ | ⋮ | ⋮ | ⋮ |

METHOD AND APPARATUS FOR STORING OR DISPLAYING PRESPECIFIED GEOMETRIC OBJECTS AND COMPUTER PROGRAM PRODUCT

PRIORITY CLAIM

This is a U.S. national stage of application No. PCT/EP2007/062607, filed on 21 Nov. 2007. Priority is claimed on German Application No. 10 2006 055 958.4 filed 24 Nov. 2006, the content of which is incorporated here by reference.

BACKGROUND OF THE INVENTION

1. Field of the Invention

The invention relates to a method and apparatus for storing prespecified geometric objects on a storage medium. The invention also relates to a method and an apparatus for displaying the prespecified geometric objects on a display apparatus. The invention also relates to a computer program product.

2. Description of Prior Art

A modern navigation device generally has at least one map which is stored on a storage medium of the navigation device. The stored map is preferably as realistic as possible. For the purpose of navigation, the map is displayed as realistically as possible in order to facilitate navigation and orientation using the map. The map is an arrangement of many prespecified geometric objects. The navigation device, in particular the storage medium, generally has only a limited storage capacity since the navigation device should naturally be mobile and a lot of storage mace also requires a lot of mace and/or weight.

SUMMARY OF THE INVENTION

An object of the invention is to provide a method and an apparatus for storing prespecified geometric objects, which make it possible to store a large number of prespecified geometric objects in a simple manner.

According to a first aspect of the invention, the invention is embodied by a method and apparatus for storing prespecified geometric objects on a storage medium. A respective distance is determined between each of the prespecified geometric objects and at least one other of the prespecified geometric objects, said distance being representative of similarity of the corresponding prespecified geometric objects. The prespecified geometric objects are combined into groups on the basis of the distances between the prespecified geometric objects in such a manner that the prespecified geometric objects are more similar to prespecified geometric objects in the same group than to prespecified geometric objects in the other groups. A representative object is determined for each group on the basis of the prespecified geometric objects inside the groups. The representative object meets a quality criterion with regard to its similarity to the prespecified geometric objects in the corresponding group, said quality criterion depending on the distances between the representative object and the individual prespecified geometric objects in the corresponding group. The representative objects of all groups are stored. Values, an identifier of the prespecified geometric object and a reference to the corresponding representative object of the prespecified geometric object are stored for each of the prespecified geometric objects in a manner representative of the prespecified geometric objects. The values prespecify a size and position of the corresponding representative object on the basis of the size and position of the corresponding prespecified geometric object.

This makes it possible, in particular given a prespecified storage capacity, to store far more prespecified geometric objects with a prespecified level of accuracy than would be possible when storing the prespecified geometric objects themselves. The prespecified geometric objects are, for example, lines, polygons and/or simple two-dimensional or three-dimensional bodies. The representatives, the identifiers and the values are preferably stored on a storage medium of a stationary computer in order to then be copied to the storage medium which is preferably arranged in a navigation device.

A computer program for combining the prespecified geometric objects into groups may comprise or call a function for determining the distance. The values may be, for example, parameters of a transformation matrix. The transformation matrix is used, for example, to transform coordinates and/or multiply vectors which describe the prespecified geometric objects. The values are stored in a manner assigned to the identifiers of the prespecified geometric objects. Alternatively or additionally, the values may comprise coordinates from which characteristic points of the prespecified geometric objects, for example corners and/or starting and/or end points of lines, are suspended and/or between which the representatives are spread.

In one advantageous refinement of the invention, the prespecified geometric objects are arranged in a prespecified arrangement. The values prespecify the size and position of the representatives in the prespecified arrangement. This makes it possible to store the prespecified arrangement with far more prespecified geometric objects with a prespecified level of accuracy than would be possible when storing the prespecified geometric objects themselves.

In another advantageous refinement of the invention, the prespecified geometric objects comprise lines. In order to determine the distance between two of the lines, the lines are shifted in such a manner that a respective starting point of the two lines is at an origin of a coordinate system. The lines are rotated and stretched or compressed in such a manner that a respective end point of the two lines is at a prespecified point on an axis of the coordinate system. A separation between the two lines is determined at prespecified support points. The distance between the two lines is determined based on the separations between the two lines at the support points. If the arrangement is a map, the lines are preferably road courses. Shifting, rotating, stretching or compressing prespecifies a shift vector, an angle of rotation or a stretching factor. The shift vector, the angle of rotation and/or the stretching factor are, for example, the values, in particular the parameters, which can be used to determine the size and position of the representatives. A transformation matrix containing these parameters may be inverted so that the size and position of the representatives can be determined. The fact that the representatives produce a topologically closed network is also preferably taken into account. Alternatively, the coordinates of the starting and end points of the lines may be stored as values, in which case, in order to display the arrangement, starting points of the corresponding representatives are shifted to starting points of the corresponding lines, for example, and the representatives are rotated, compressed or stretched until the end points of the representatives are at the end points of the corresponding lines. This contributes, in a simple manner, to the arrangement being topologically closed. In this context, the lines are preferably road courses.

The operation for determining the distance between two lines, in particular between two road courses, is an independent aspect of the operation of storing the prespecified geometric objects. If the operation of determining the distance between the lines is independent of the operation of storing the prespecified geometric objects, the lines are first of all detected electronically. The distance between the lines is then determined according to the statements made above. The distance can then be output as a measure of length and may be an input variable for different applications.

In another advantageous refinement of the invention, the prespecified geometric objects are combined into groups in such a manner that the respective paired distances between the prespecified geometric objects inside the corresponding group are smaller than a prespecified first distance threshold value. This contributes, in a simple manner, to combining similar prespecified geometric objects in a group.

In another advantageous refinement of the invention, error values are determined on the basis of the distances between the prespecified geometric objects and their representatives. The error values are assigned to the identifier of the prespecified geometric objects and are stored. This makes it possible, in a simple manner, to determine a quality of the stored arrangement.

In another advantageous refinement of the invention, the arrangement comprises a map. The prespecified geometric objects comprise road courses, buildings, squares and/or natural objects. This makes it possible to store the map even if the storage capacity of the storage medium is restricted and even if the number of prespecified geometric objects in the map is particularly high. This also makes it possible to preferably display the map as realistically as possible.

In another advantageous refinement of the invention, a possible number of representatives is determined on the basis of the storage capacity of the storage medium on which the prespecified geometric objects are intended to be stored. The prespecified geometric objects are combined into groups in such a manner that a number of groups corresponds to the possible number of representatives.

This may contribute to preferably as many of the prespecified geometric objects as possible preferably being stored as accurately as possible.

According to an embodiment of the invention is by a method and apparatus for displaying the prespecified geometric objects on a display apparatus, wherein the apparatus comprises the storage medium on which the representatives are stored in a manner representative of the prespecified geometric objects. The values are also stored on the storage medium in a manner representative of the size and position of the representatives. The values are dependent on the size and position of the prespecified geometric objects. For the purpose of display, one of the representatives is determined for each prespecified geometric object. The representative represents the group of prespecified geometric objects containing the corresponding prespecified geometric object and meets a quality criterion with regard to its similarity to the prespecified geometric objects in the corresponding group, said quality criterion depending on the distances between the representative and the individual prespecified geometric objects in the corresponding group. The position and size of the representative are determined for each of the determined representatives using the values. The representative is displayed in the position and size determined. The navigation device may also be referred to as an apparatus for displaying prespecified geometric objects on a display apparatus.

In one advantageous refinement of the invention, the representative and the values assigned to the latter are determined on the basis of the identifier. The identifier is stored in a manner representative of the prespecified geometric object. The identifier is assigned the representative and the values.

In another advantageous refinement of the invention, the prespecified geometric objects are arranged in the prespecified arrangement. The values prespecify the size and position of the representative in the prespecified arrangement.

In another advantageous refinement of the invention, the arrangement comprises a map. The prespecified geometric objects comprise road courses, buildings, squares and/or natural objects.

The advantageous refinements of the invention can be readily applied to advantageous refinements of the methods and/or apparatuses.

The invention is also distinguished by a computer program product comprising a computer-readable storage unit with program instructions which can be executed by a computer and are designed to carry out the method according to the first and/or second aspect of the invention.

BRIEF DESCRIPTION OF THE DRAWINGS

The invention is explained in more detail below using diagrammatic drawings, in which:

FIG. 1 is a section of a map;
FIG. 2 depicts first prespecified geometric objects;
FIG. 3 depicts second prespecified geometric objects;
FIG. 4 depicts third prespecified geometric objects.

Elements having the same structure or function are identified using the same reference symbols in a manner encompassing the figures.

DETAILED DESCRIPTION OF THE PREFERRED EMBODIMENTS

Figure 5:
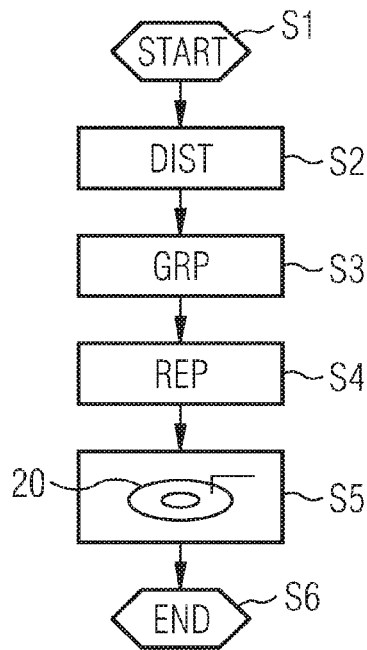
FIG. 5 is a flowchart of a program for storing, the prespecified geometric objects.

A section of a map 2 shown in FIG. 1 represents a section of a prespecified arrangement of a plurality of prespecified geometric objects. The prespecified geometric objects comprise lines, polygons and simple geometric shapes. The lines are preferably road courses, in particular a first, a second and a third road course 4, 6, 8 are shown in FIG. 2. The road courses preferably extend from one intersection to the next. Polygons preferably represent areas, for example woods, parks, parking lots and/or complicated building structures. The polygons comprise, in particular, a first polygon 10 and a second polygon 12 shown in FIG. 3. The simple geometric shapes, in particular a first, a second and a third simple geometric shape 14, 16, 18 shown in FIG. 4, are preferably used to represent buildings.

The map 2 is preferably displayed on a display of a navigation device 100. The navigation device is mobile and therefore has a storage medium 20 having only a limited storage capacity M. The prespecified geometric objects are preferably displayed on a display, apparatus of the navigation device as realistically as possible. For this purpose, the prespecified geometric objects are preferably stored as realistically as possible. This contributes to simple and convenient orientation and to simple navigation with the navigation device. However, due to the limited storage capacity M of the storage medium 20, not all prespecified geometric objects can be stored in a realistic manner in order to be able to be subsequently displayed in a realistic manner. Therefore, not all prespecified geometric objects are preferably stored on the storage medium 20.

A flow chart for a program for storing the prespecified geometric objects is preferably stored on a storage medium of a stationary computer is shown in FIG. 5. The computer may be referred to as an apparatus for storing the prespecified geometric objects. The program for storing the prespecified geometric objects is preferably used to store the prespecified geometric objects on the storage medium of the stationary computer in a particularly realistic manner while preferably requiring the smallest possible amount of storage space. The prespecified geometric objects are then preferably copied to the storage medium 20 having the storage capacity M of the navigation device. The program for storing the prespecified geometric objects is preferably started in a step S1 in which variable's are initialized if necessary.

In a step S2, distances DIST between the prespecified geometric objects are determined. The distance DIST is a measure of how similar two respective objects of the prespecified geometric objects are. The greater the distance DIST between the prespecified geometric objects, the lower the similarity of the corresponding prespecified geometric objects to one another.

Figures 7, 8:
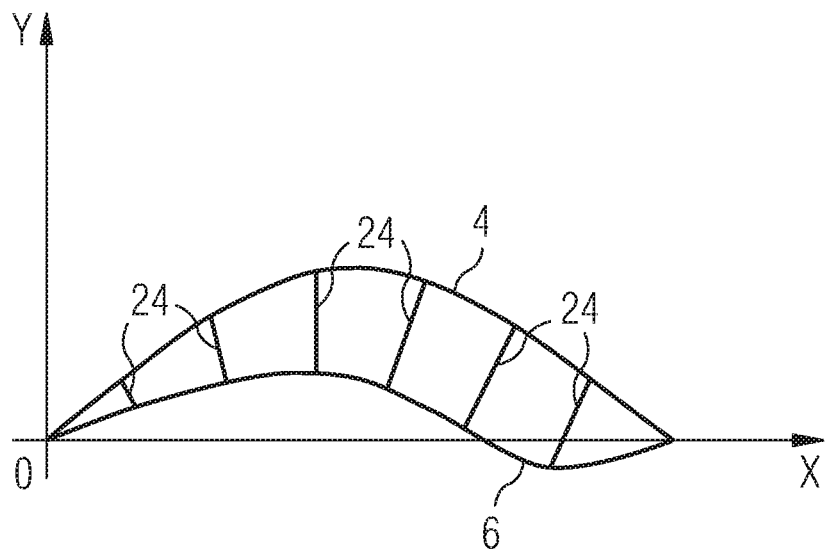
FIG. 7 depicts an operation of determining the distance between two road courses.
FIG. 8 is a transformation matrix.

The distance DIST between two of the lines, in particular between the first road course 4 and the second road course 6, can be determined, for example, by shifting a respective starting point of the two road courses to an origin of a coordinate system as shown ink, FIG. 7, for example. The two road courses are then rotated, stretched or compressed in such a manner that their end points come to rest on a common axis at a common point on the corresponding axis. The axis is preferably an X axis of the coordinate system. A separation between the two road courses is then respectively determined at prespecified support points 24 between the starting and end points of the two road courses. The distance DIST is then determined on the basis of the separations. For example, the distance DIST may correspond to a maximum separation between the two road courses. Alternatively, the distance DIST may be an average value of the separations, for example.

In a step S3, the prespecified geometric objects are combined into groups GRP. The prespecified geometric objects are preferably combined into groups GRP in such a manner that the prespecified geometric objects inside one of the groups GRP are more similar to prespecified geometric objects in the same group GRP than to prespecified geometric objects in another of the groups GRP. For example, all prespecified geometric objects whose distances DIST from one another are smaller than a prespecified first distance threshold value may be combined into one of the groups GRP. Alternatively, a commercially available grouping algorithm may be used to form the groups GRP. Such a grouping algorithm may require, for example, the distances DIST as input parameters. Alternatively or additionally, the grouping algorithm may call a function for determining the distances DIST.

In a step S4, a representative REP is determined for all prespecified geometric objects inside one of the groups GRP. A respective one of the representatives REP which represents the prespecified geometric objects in the corresponding group GRP is thus determined for each group GRP. The representative REP may be, for example, one of the prespecified geometric objects. Alternatively, the representative REP may be newly determined. The representative REP is preferably determined in such a manner that it meets a prespecified quality criterion with regard to its similarity to the prespecified geometric objects in the corresponding group GRP represented by the representative REP. The prespecified quality criterion may comprise, for example, the fact that its distances DIST from the prespecified geometric objects inside the corresponding group GRP are, on average, smaller than the distances DIST between the remaining prespecified geometric objects and the respective other prespecified geometric objects in the same group GRP. Alternatively or additionally, the distances DIST between the representative REP and the remaining prespecified geometric objects may be smaller than a second prespecified distance threshold value.

Figures 9, 10:
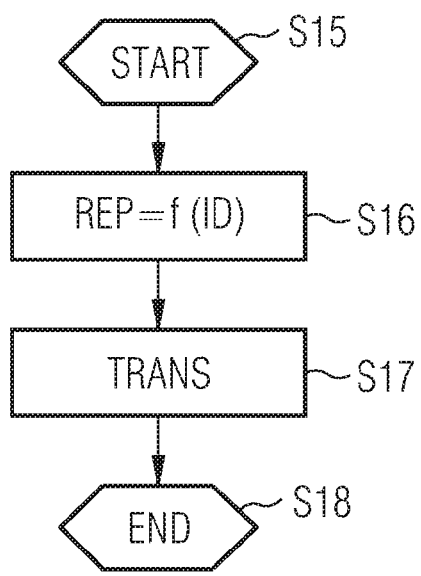
FIG. 9 is a reference table.
FIG. 10 is a flowchart of a program for displaying the prespecified geometric objects.

In a step S5, the representatives REP are preferably first stored on the storage medium of the stationary computer and are then copied to the storage medium 20 of the navigation device. A table shown in FIG. 9 is preferably also stored. The table preferably comprises an identifier ID which is uniquely assigned to the corresponding prespecified geometric object, values which are representative of a position and size of the prespecified geometric objects, and a reference REF to the corresponding representative REP.

In a step S6, the program for storing the prespecified geometric objects may be ended.

The program for storing the prespecified geometric objects is preferably used to store the arrangement of the prespecified geometric objects in the form of a map 2. In this context, the values represent the size and position of the prespecified geometric objects inside the map 2.

In order to display the prespecified geometric objects, a program for displaying the prespecified geometric objects is preferably stored on the storage medium 20 of the navigation device and includes the steps shown in FIG. 10. The program for displaying the prespecified geometric objects is used to display the representatives REP, instead of the geometric objects, in such a manner that they preferably represent the prespecified geometric objects in a particularly realistic manner. The program for displaying the prespecified geometric objects is started in a step S15 in which variables are initialized, if necessary.

In a step S16, the representatives REP, instead of the prespecified geometric objects, are loaded using the identifiers ID.

In a step S17, a size and position of the representatives REP are determined using the values assigned to the identifiers ID. In the step S17, the representatives REP are also transformed on the basis of the values and are output on the display apparatus of the navigation device. The values which relate to the size and position of the representatives REP are preferably be taken from the table. The size and position of the representatives REP are dependent on the size and position of the prespecified geometric objects. The values which are then used to determine the size and position of the representatives REP are preferably determined on the basis of the size and position of the prespecified geometric objects.

In a step S18, the program for displaying the prespecified geometric objects may be ended. The program for displaying the prespecified geometric objects is preferably used to display the prespecified arrangement or at least part of the prespecified arrangement of the prespecified geometric objects in the form of a map 2 or a section of the map 2. For this purpose, the size and position of the representatives REP inside the map 2 can be determined on the basis of the values. The program for displaying the prespecified geometric objects is regularly executed during operation of the navigation device, to be precise whenever a new section of the map 2 has to be displayed.

The size and position of the representatives REP may be determined, for example, by the values comprising coordinates of characteristic points of the prespecified geometric objects and the coordinates being stored. The characteristic points may be, for example, starting and/or end points of the lines and/or corners of the polygons or of the simple prespecified geometric shapes. The representatives REP can then be suspended from the stored coordinates by means of the characteristic points and/or may be spread between the stored coordinates. The latter is particularly advantageous if the distances between the lines, in particular the road courses, are determined as explained above since a correct position of the starting and end points is then guaranteed, which results in a topologically closed network.

Figure 6:
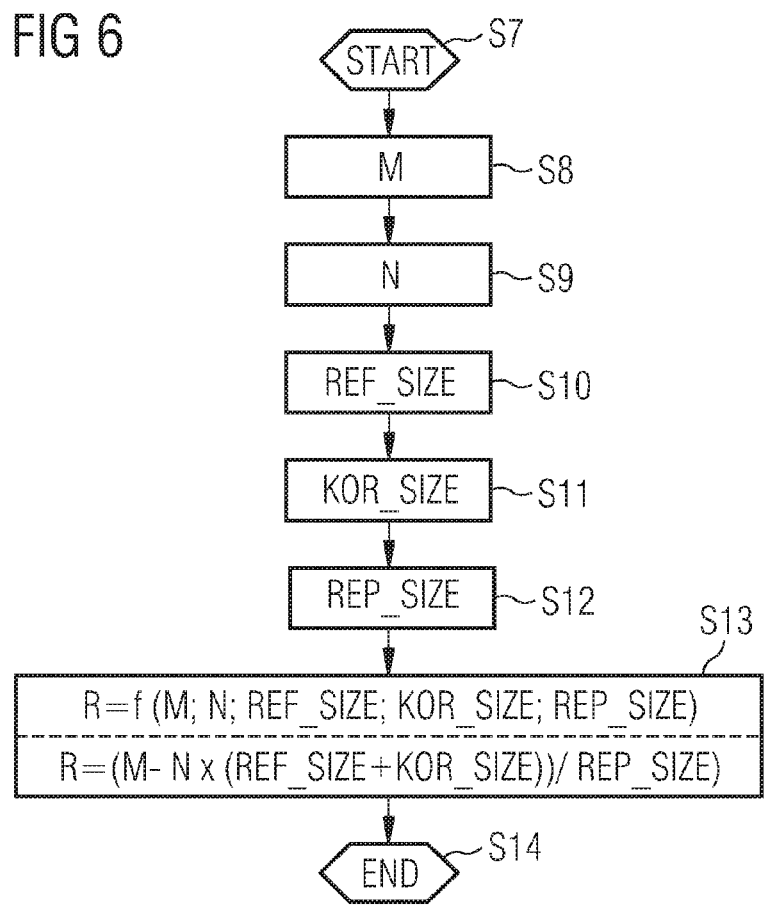
FIG. 6 shows a flowchart of a program for determining a possible number of representatives.

Alternatively, the size and position of the representatives REP may be determined by the stored values comprising parameters of a transformation matrix TRANS shown in FIG. 6. The parameters are, for example, a shift, value $X_0$ in the X direction, a shift value $Y_0$ in the Y direction, a stretching factor S and an angle of rotation ALPHA. By means of the shift values, the representatives. REP may be shifted in the map, for example starting from the coordinate origin, until one of the characteristic points of the representatives REP is at a coordinate assigned to it. The representative REP is then rotated on the basis of the angle of rotation ALPHA, and is stretched or compressed on the basis of the stretching factor S, until all points of the representative REP are at their prespecified coordinates so that a network comprising the lines, in particular a network comprising the road courses, is topologically closed. This is preferably carried out with the aid of homogeneous coordinates and the transformation matrix TRANS. An X mapping value X' of an X value X and a Y mapping value Y' of a Y value Y of the individual points are then preferably determined using the calculation rule in FIG. 8. In order to display the representatives REP, the transformation matrix TRANS is used on the representatives REP.

The storage capacity M of the storage medium 20 of the navigation device is preferably used in an optimum manner if a number of representatives R is matched to the storage capacity M. The more representatives REP stored, the more similar these representatives REP may be to the prespecified geometric objects. This means that, with an increasing storage space requirement on account of an increasing number of representatives R, accuracy of the displayed map 2 is also improved. It is thus particularly advantageous to match the number of representatives R to the storage capacity M of the storage medium 20 of the navigation device. For this purpose; a program for determining the number of representatives R is preferably stored on the storage medium of the stationary computer of FIG. 6. The program for determining the number of representatives R is preferably started in a step S7 in which Variables are initialized if necessary.

In a step S8, the storage capacity M of the storage medium 20 of the navigation device is determined. This step is preferably carried out only once. The storage capacity M is then known and can be prespecified when the program for determining the number of representatives R is executed again.

In a step S9, a number of objects N of the prespecified geometric objects is determined.

In a step S10, a size REF_SIZE of a reference which is used to allocate the corresponding representative REP to the prespecified geometric object is determined. In this context, the size REF_SIZE of the reference means an amount of storage space required by the corresponding reference.

In a step S11, a size KOR_SIZE of the values is determined. In this context, the size KOR_SIZE of the values means an amount of storage space required by the values, in particular the coordinates and/or the parameters.

In a step S12, a size REP_SIZE of the representatives REP is determined. In this context, the size REP_SIZE of the representatives REP represents the amount of storage space required by the corresponding representative REP. An empirically determined average value of the storage space, for example, can be used for the representative REP for this purpose.

In a step S13, the number of representatives R is determined on the basis of the storage capacity M, the number of objects N, the size REF_SIZE of the reference, the size KOR_SIZE of the values and the size REF_SIZE of the representatives REP, preferably according to the calculation rule specified in step S13.

In a step S14, the program for determining the number of representatives R is preferably ended.

In addition, an error value may be determined for each of the prespecified geometric objects based on the distance DIST between the corresponding prespecified geometric object and the representative REP assigned to the latter. The error value is representative of the extent to which the corresponding prespecified geometric object differs from its representative. A display quality of all prespecified geometric objects, in particular of the map 2, can then be determined based on the error values. The quality is then a measure of how realistically the map 2 is stored and/or can be displayed.

Program instructions of the program for storing the geometric objects and/or of the program for displaying the geometric objects may be stored on a computer-readable storage unit of a computer program product. The storage unit is, for example, a CD and/or a DVD.

The invention is not restricted to the exemplary embodiments specified. For example, different distance functions can be used for different prespecified geometric objects. In addition, the program for determining the number of representatives R and the program for storing the prespecified geometric objects may be implemented in one program. Furthermore, the navigation device may comprise one or more further storage media 20. The storage medium 20 may be, for example, preferably a hard disk, a CD and/or a flash memory.

What is claimed is:

1. A method for storing a plurality of prespecified geometric objects on a computer readable storage medium, the method comprising:
    determining a respective distance between at least one of the prespecified geometric objects and each of the other plural prespecified geometric objects, said distance being representative of a similarity of corresponding ones of the plural prespecified geometric objects;
    combining the plural prespecified geometric objects into one or more groups based at least in part on the determined distances such that the prespecified geometric objects in a same group are more similar to each other than to prespecified geometric objects in another group;
    determining a representative for each group based at least in part on the prespecified geometric objects in each of the at least one groups, said representative meeting a quality criterion based at least in part on its similarity to the prespecified geometric objects in the corresponding group and on the distances between the representative and each of the combined prespecified geometric objects in the corresponding group;
    storing each of the representatives for each of the at least one groups,
    storing for each of the plural prespecified geometric objects only:
        an identifier of the prespecified geometric object,
        a reference to the corresponding representative of the prespecified geometric object, and at least one value configured to prespecify a size and position of the corresponding representative based at least in part on a size and position of the corresponding prespecified geometric objects.

2. The method according to claim 1, wherein the prespecified geometric objects are arranged in a prespecified arrangement and the values prespecify the size and position of the representative in the prespecified arrangement.

3. The method according to claim 2, wherein the prespecified arrangement comprises a map and the prespecified geometric objects comprise at least one of road courses, buildings, squares, and natural objects.

4. The method according to claim 1, wherein the prespecified geometric objects comprise lines, and a method to determine a distance between two of the lines comprises:
    shifting the lines such that a respective starting point of each of the two lines is at an origin of a coordinate system;
    at least one of rotating, stretching, and compressing the lines such that a respective end point of each of the two lines is at a prespecified point on an axis of the coordinate system;
    determining a separation between the two lines is at a plurality of prespecified support points; and
    determining the distance between the two lines based at least in part on the separations between the two lines at the plural support points.

5. The method according to claim 1, wherein the prespecified geometric objects are combined into the groups such that respective paired distances between the prespecified geometric objects inside the group are less than a first distance threshold value.

6. The method according to claim 1, further comprising:
    determining error values based at least in part on the distances between the prespecified geometric objects and their representatives;
    assigning and the error values to the identifier of the prespecified geometric objects; and
    storing the error values.

7. The method according to claim 1, further comprising:
    determining a number of representatives based at least in part on a storage capacity of the computer readable storage medium,
    wherein the prespecified geometric objects are combined into groups such that a number of groups corresponds to the possible number of representatives.

8. The method according to claim 1, wherein the prespecified geometric objects are elements displayed on a display of a navigation system.

9. An apparatus for storing prespecified geometric objects on a storage medium, the apparatus configured to:
    determine a respective distance between each of a plurality of prespecified geometric objects and at least one other of the plural prespecified geometric objects, the distance being representative of similarity of the corresponding prespecified geometric objects;
    combine the prespecified geometric objects into groups based at least in part on distances between the prespecified geometric objects such that the prespecified geometric objects are more similar to prespecified geometric objects in a same group than to prespecified geometric objects in another group;
    determine a representative for each group based at least in part on the prespecified geometric objects inside the groups, said representative meeting a quality criterion based on its similarity to the prespecified geometric objects in the corresponding group, said quality criterion depending on the distances between the representative and the individual prespecified geometric objects in the corresponding group;
    store the representatives of all groups;
    store only an identifier of the prespecified geometric object for each of the prespecified geometric objects in a manner representative of the prespecified geometric objects, a reference to the corresponding representative of the prespecified geometric object and values which prespecify a size and position of the corresponding representative based on the size and position of the corresponding prespecified geometric objects.

10. The apparatus according to claim 9, wherein the apparatus is a navigation system.

11. A method for displaying prespecified geometric objects on a display apparatus, representatives being stored on a computer readable storage medium in a manner representative of the prespecified geometric objects, and values which are dependent on a size and position of the prespecified geometric objects being stored on the computer readable storage medium in a manner representative of a size and position of the representatives, the method comprising:
    determining one of the representatives for each prespecified geometric object, said representative representing a group of prespecified geometric objects containing a corresponding prespecified geometric object and meeting a quality criterion with regard to its similarity to the prespecified geometric objects in the corresponding group, said quality criterion based at least in part on the distances between the representative and the individual prespecified geometric objects in the corresponding group;
    determining a position and size of the representative for each of the determined representatives using the values; and
    displaying the representative in the determined position and size.

12. The method according to claim 11, wherein the representative and the values assigned to the representative are determined based at least in part on an identifier stored in a manner representative of the prespecified geometric object, the identifier being assigned the representative and the values.

13. The method according to either of claim 12, wherein the arrangement comprises a map and the prespecified geometric objects comprise at least one of road courses, buildings, squares, and natural objects.

14. The method according to claim 11, wherein the prespecified geometric objects are arranged in a prespecified arrangement and the values prespecify the size and position of the representatives in the prespecified arrangement.

15. The method according to claim 11, wherein the prespecified geometric objects are elements displayed on a display of a navigation system.

16. An apparatus for displaying prespecified geometric objects on a display apparatus, representatives being stored on a storage medium in a manner representative of prespecified geometric objects, and values which are dependent on a size and position of the prespecified geometric objects being stored on the storage medium in a manner representative of a size and position of the representatives, the apparatus configured to:
    determine one of the representatives for each prespecified geometric object, the representative representing a group of prespecified geometric objects containing the corresponding prespecified geometric object, and the representative meeting a quality criterion with regard to its similarity to the prespecified geometric objects in the corresponding group;
determine a position and size of the representative for each of the determined representatives using the values,
display the representative in the position and size determined.

17. The apparatus according to claim 16, wherein the apparatus is a navigation system.

18. A computer program product comprising a computer-readable storage unit with program instructions which can be executed by a computer configured that cause the computer to:
  determine a respective distance between at least one of the prespecified geometric objects and each of the other plural prespecified geometric objects, said distance being representative of a similarity of corresponding ones of the plural prespecified geometric objects;
  combine the plural prespecified geometric objects into one or more groups based at least in part on the determined distances such that the prespecified geometric objects in a same group are more similar to each other than to prespecified geometric objects in another group;
  determine a representative for each group based at least in part on the prespecified geometric objects in each of the at least one groups, said representative meeting a quality criterion based at least in part on its similarity to the prespecified geometric objects in the corresponding group and on the distances between the representative and each of the combined prespecified geometric objects in the corresponding group;
  store each of the representatives for each of the at least one groups; and
  store for each of the plural prespecified geometric objects only:
    an identifier of the prespecified geometric object,
    a reference to the corresponding representative of the prespecified geometric object, and
    at least one value configured to prespecify a size and position of the corresponding representative based at least in part on a size and position of the corresponding prespecified geometric objects.

19. A computer program product comprising a computer-readable storage unit with program instructions which can be executed by a computer that cause the computer to:
  determine one of the representatives for each prespecified geometric object, said representative representing a group of prespecified geometric objects containing a corresponding prespecified geometric object and meeting a quality criterion with regard to its similarity to the prespecified geometric objects in the corresponding group, said quality criterion based at least in part on the distances between the representative and the individual prespecified geometric objects in the corresponding group;
  determine a position and size of the representative for each of the determined representatives using the values; and
  display the representative in the determined position and size.

* * * * *